(12) United States Patent
Kawahara et al.

(10) Patent No.: US 7,684,328 B2
(45) Date of Patent: Mar. 23, 2010

(54) DATA TRANSFER NETWORK

(75) Inventors: Masato Kawahara, Tokyo (JP);
Hideaki Okayama, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 799 days.

(21) Appl. No.: 11/441,001

(22) Filed: May 26, 2006

(65) Prior Publication Data
US 2006/0268910 A1 Nov. 30, 2006

(30) Foreign Application Priority Data
May 26, 2005 (JP) .............................. 2005-153776

(51) Int. Cl.
*H04L 12/28* (2006.01)
*H04L 12/56* (2006.01)
(52) U.S. Cl. ...................... 370/231; 370/222; 370/230; 370/310; 370/401; 370/406
(58) Field of Classification Search ......... 370/389–463, 370/222–338
See application file for complete search history.

(56) References Cited

U.S. PATENT DOCUMENTS

| 5,408,677 | A | * | 4/1995 | Nogi ............................. | 712/6 |
| 6,055,599 | A | * | 4/2000 | Han et al. .................... | 710/317 |
| 6,219,705 | B1 | * | 4/2001 | Steinberger et al. ......... | 709/224 |
| 6,275,508 | B1 | * | 8/2001 | Aggarwal et al. ........... | 370/503 |
| 6,889,275 | B2 | * | 5/2005 | Vandecappelle et al. ..... | 710/107 |
| 6,907,002 | B2 | * | 6/2005 | Beshai et al. ................. | 370/230 |
| 6,967,954 | B2 | * | 11/2005 | Sugiyama ............... | 370/395.52 |
| 7,082,132 | B1 | * | 7/2006 | Beshai et al. ................. | 370/391 |
| 7,236,699 | B2 | * | 6/2007 | Beshai et al. .................. | 398/45 |
| 7,239,606 | B2 | * | 7/2007 | Gilmour et al. .............. | 370/222 |
| 7,447,901 | B1 | * | 11/2008 | Sullenberger et al. ........ | 713/153 |
| 7,450,845 | B2 | * | 11/2008 | Beshai et al. ................... | 398/47 |
| 2002/0167954 | A1 | * | 11/2002 | Highsmith et al. ........... | 370/406 |
| 2002/0191250 | A1 | * | 12/2002 | Graves et al. ................ | 359/128 |
| 2004/0162144 | A1 | * | 8/2004 | Loose et al. ................... | 463/42 |
| 2006/0184342 | A1 | * | 8/2006 | Narain ............................ | 703/2 |
| 2007/0008982 | A1 | * | 1/2007 | Voit et al. ..................... | 370/401 |
| 2007/0076719 | A1 | * | 4/2007 | Allan et al. ................... | 370/392 |
| 2007/0133410 | A1 | * | 6/2007 | Kawahara et al. ............ | 370/231 |
| 2008/0253308 | A1 | * | 10/2008 | Ward et al. .................... | 370/310 |

FOREIGN PATENT DOCUMENTS

JP 2007166168 A * 6/2007

* cited by examiner

*Primary Examiner*—Ayaz R Sheikh
*Assistant Examiner*—Venkatesh Haliyur
(74) *Attorney, Agent, or Firm*—Rabin & Berdo, P.C.

(57) ABSTRACT

The present invention provides a data transfer network receiving a higher evaluation overall than conventional ones from various perspectives such as the number of effective nodes, the required number of links, and the required maximum node capacity. The present invention is a data transfer network of a hyper configuration in which each node is an element of m (m is 2 or more) different local networks. Further, at least one of the local networks to which the respective nodes belong is a hub network and, when a node belongs to a local network other than a hub network, the local network is a full mesh network.

2 Claims, 14 Drawing Sheets

DATA TRANSFER NETWORK

BACKGROUND OF THE INVENTION

1. Field of the Invention

The present invention relates to a data transfer network in which a plurality of nodes is connected.

The data transfer network of the present invention can be applied to networks in general, such as the general Internet, public communication networks, company-internal communication networks, LAN, computer networks, distributed computer networks, distributed router networks, exchange networks, switch networks that are used in devices that perform data communications such as routers and so forth, data communication networks that link CPUs, memory, and so forth, and data communication networks in LSI such as CPU, for example.

2. Description of Related Art

Data transfer networks in which a plurality of nodes is connected that perform distributed processing to respective nodes include (A) bus networks, (B) ring networks, (C) hub networks (star-shaped networks), (D) full mesh networks, (E) hyper expanded (hypercube) networks, and so forth. A hypercube network is a hyper structure network that comprises a bus network or ring network as a plurality of local networks (sub-networks).

Furthermore, it is considered that, in the future, the number of terminals contained in data transfer networks will increase and that data transfer speeds will increase. Hence, it is important to increase the amount of data (traffic) that can be processed by the whole network, that is, to raise the traffic capacity. It is therefore necessary to investigate optimization and increased efficiency and so forth of the network configuration.

The capacity of the five types of network above will be described with reference to FIGS. 12 to 14.

FIG. 12 shows the relationship between the numbers of nodes contained in the respective networks and the effective node number. The effective node number indicates the traffic that can be processed by the whole network with the number of nodes serving as the units.

FIG. 13 shows the relationship between the number of nodes contained in the respective networks and the required link number. The required link number is the number of connections between nodes required in order to configure the network.

FIG. 14 shows the relationship between the number of nodes contained in the respective networks and the available maximum node capacity. The available maximum node capacity indicates the processing power of the nodes for which the required processing power is maximum among the nodes contained in the network. FIG. 14 shows the available maximum node capacity in arbitrary units.

As shown in FIG. 12, when the networks are configured by using the same numbers of nodes, the effective node number grows smaller in order starting with the full mesh network as the largest, followed by the hub network, the hypercube network, the ring network, and then the bus network.

However, in a full mesh network, one node is connected to all of the other nodes. As a result, as shown in FIG. 13, the required link number is huge in comparison with the links required in networks of other configurations.

On the other hand, in hub networks, signals from all the nodes pass through a relay device at the core of a star shape. Hence, as shown in FIG. 14, the available maximum node capacity has a huge value in comparison with networks of other configurations.

Conventionally, when distributed processing has been performed in the whole network by a plurality of nodes, a hypercube network has been adopted. In a hypercube network, the required link number is smaller than in a full mesh network, the available maximum node capacity is smaller than that of a hub network, a ring network, and a bus network, and the effective node number is larger than that of a ring network and a bus network. In a hypercube network, the number of local networks of which a certain node is an element is expressed as the order. In the case of a conventional hypercube network, the order is three or four. Although the effective node number increases when a higher-order hypercube structure rendered by raising the order (m) is used, the required link number (=2×m) also increases. Further, in cases where the nodes gradually increase, the initial number of nodes is often small. In a hypercube network, there is the problem that the efficiency drops when the number of nodes is small. In addition, as shown in FIG. 12, when 400 nodes are used, the effective node number is only 12 in a fifth-order hypercube network containing bus network as a local network. Therefore, this is hardly adequate in comparison with the 200 nodes of a complete mesh network and the 133 nodes of a hub network.

As a result, a new data transfer network with a higher than conventional overall evaluation from various perspectives such as the effective node number, the required link number, and the available maximum node capacity is desirable.

SUMMARY OF THE INVENTION

Therefore, the data transfer network of the present invention is constituted by a data transfer network of a hyper configuration in which each node is an element of m (m is 2 or more) different local networks. At least one local network of the respective nodes is a hub network and the local networks other than the hub network are full mesh networks.

The present invention makes it possible to realize a data transfer network that is able to exhibit a favorable balance between the merits of a hyper structure and the merits of a hub network by applying a hub network as a local network of a hyper structure.

BRIEF DESCRIPTION OF THE DRAWINGS

The foregoing and other objects, features and advantages of the present invention will be better understood from the following description taken in connection with the accompanying drawings, in which.

DESCRIPTION OF THE PREFERRED EMBODIMENTS

(A) First Embodiment

The first embodiment of the data transfer network of the present invention will be described hereinbelow with reference to the drawings.

Figure 1:
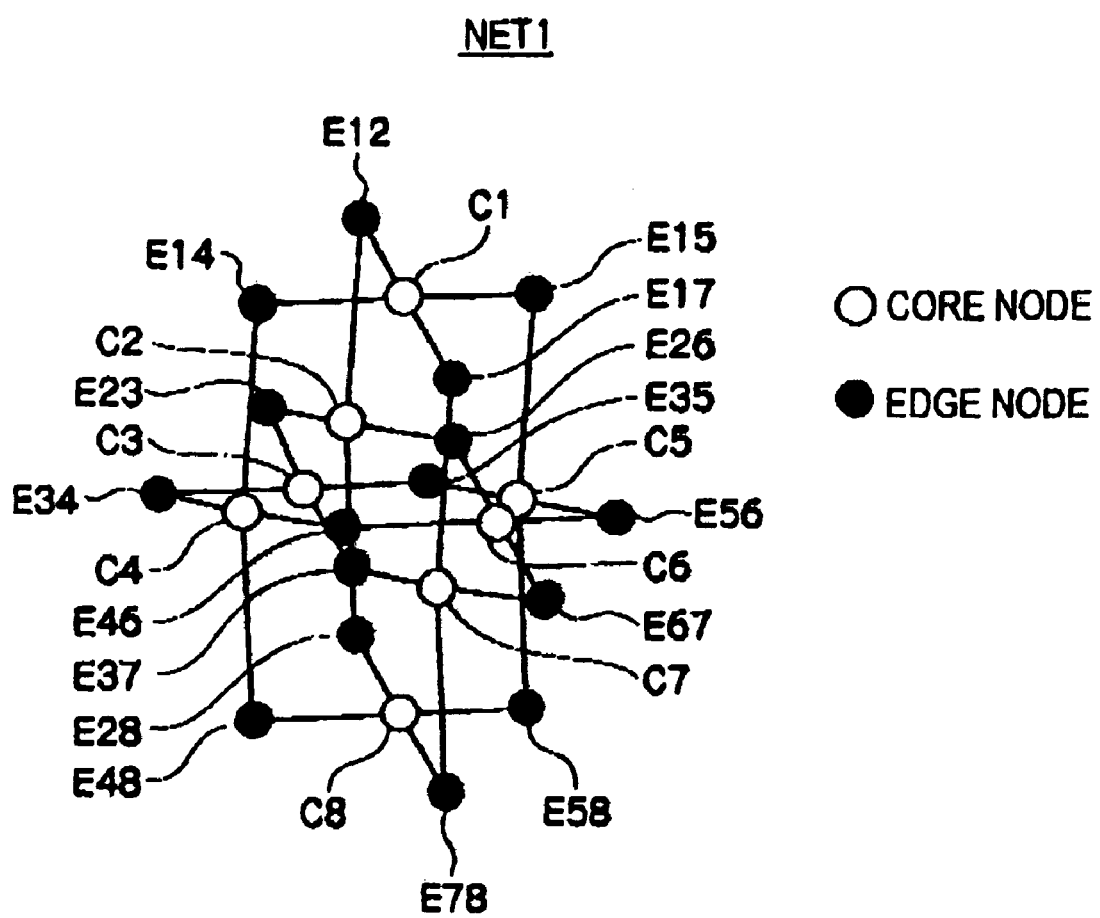
FIG. 1 is a schematic diagram showing node placement and the connected relationship between nodes of a data transfer network of a first embodiment.
Figure 2:
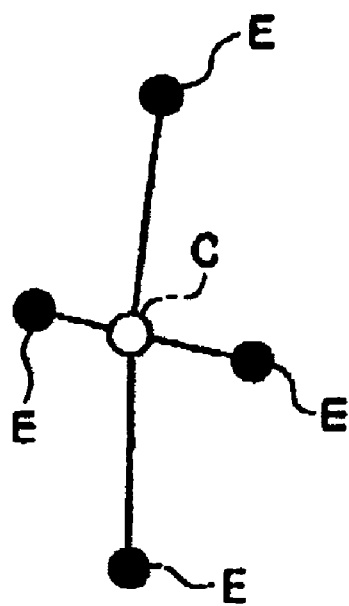
FIG. 2 is a schematic diagram showing the configuration of a hub network.

A data transfer network NET1 of the first embodiment comprises, a hub network HUB comprising N edge nodes E that are connected to a common core node C shown in FIG. 2 as a local network. The data transfer network NET1 shown in FIG. 1 comprises 16 nodes (edge nodes), wherein four edge nodes E are connected to one core node C. The data transfer network NET1 is a network with a so-called hyper structure in which one edge node is an element of a plurality of local networks. In addition, in the data transfer network NET1, at least one of the plurality of local networks of which one edge node is an element is a hub network HUB. The data transfer network using hub networks as local networks is called hyper hub network. The data transfer network NET1 shown in FIG. 1 represents a network of a second-order hyper hub structure.

As shown in FIG. 1, edge nodes $Eij$ is the element of a hub network pertaining to core nodes $Ci$ and the element of a hub network pertaining to code nodes $Cj$ different from the core nodes $Ci$. Further, in the case of the data transfer network NET1 shown in FIG. 1, the edge node $Eij$ is connected to two core-node combinations $Ci$ and $Cj$ that are different from the core-node combinations $Cx$ and $Cy$ to which other edge node $Exy$ is connected. Edge nodes with the same two core-node combinations connected thereto do not exist.

Figure 3:
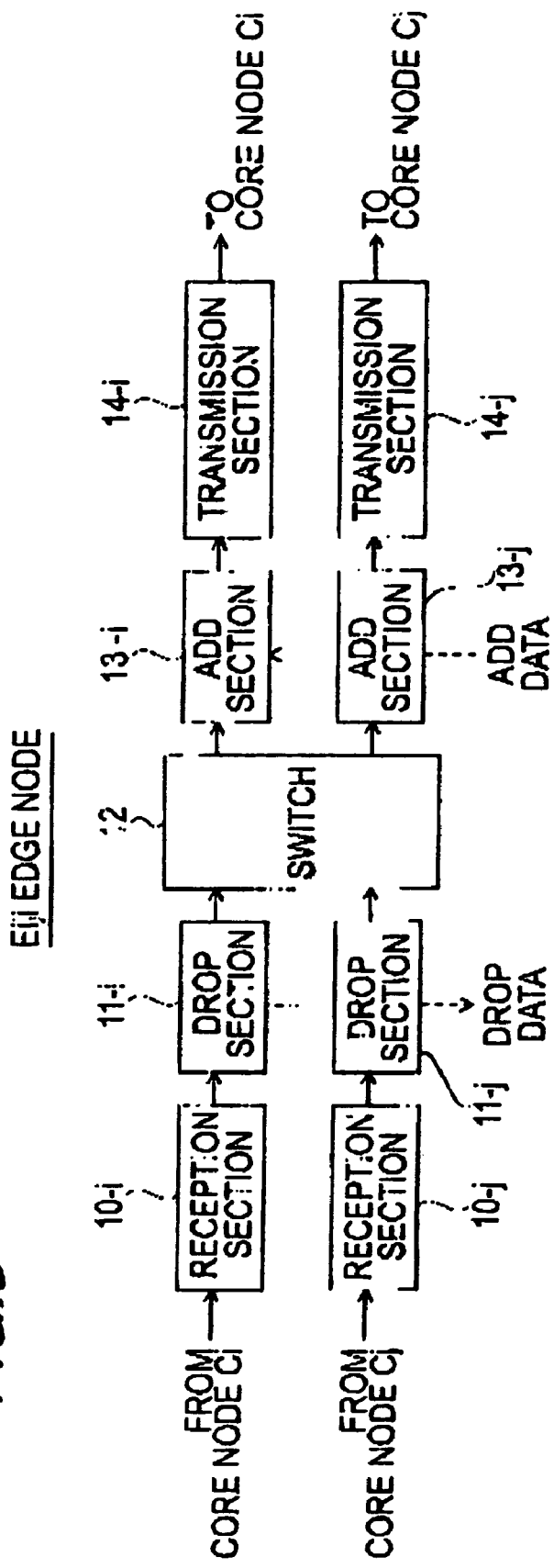
FIG. 3 is a block diagram showing an example of the internal configuration of an edge node of the first embodiment.

As shown in FIG. 3, the edge node $Eij$ of the first embodiment comprise reception sections $10\text{-}i$, $10\text{-}j$, drop sections $11\text{-}i$, $11\text{-}j$, a switch 12, add sections $13\text{-}i$, $13\text{-}j$, and transmission sections $14\text{-}i$, $14\text{-}j$. The reception sections $10\text{-}i$ and $10\text{-}j$ receive signals from the two core nodes $Ci$ and $Cj$ to which their own edge nodes $Eij$ are connected. The drop sections $11\text{-}i$ and $11\text{-}j$ take reception data in inside when the reception data are addressed to their own edge nodes. The switch 12 exchanges reception data for which their own edge node performs relay processing according to the destination. The add sections $13\text{-}i$ and $13\text{-}j$ insert data whose transmission sources are their own edge nodes to the transmission channel. The transmission sections $14\text{-}i$ and $14\text{-}j$ transmit signals to two core nodes $Ci$ and $Cj$ to which their own edge nodes are connected.

The core node $Ci$ is an element of one hub network. The internal configuration of the core node $Ci$ is the same as conventional configurations and a description of this configuration is therefore omitted here. The core node $Ci$ may have data add and drop functions in addition to a relay function.

According to the first embodiment, by using the data transfer network of a second-order hyper hub structure, it is possible to establish a network in which the ratio of the effective node number with respect to the number of nodes is high and the total number of links (required link number) and the available maximum node capacity do not increase.

Figure 4:
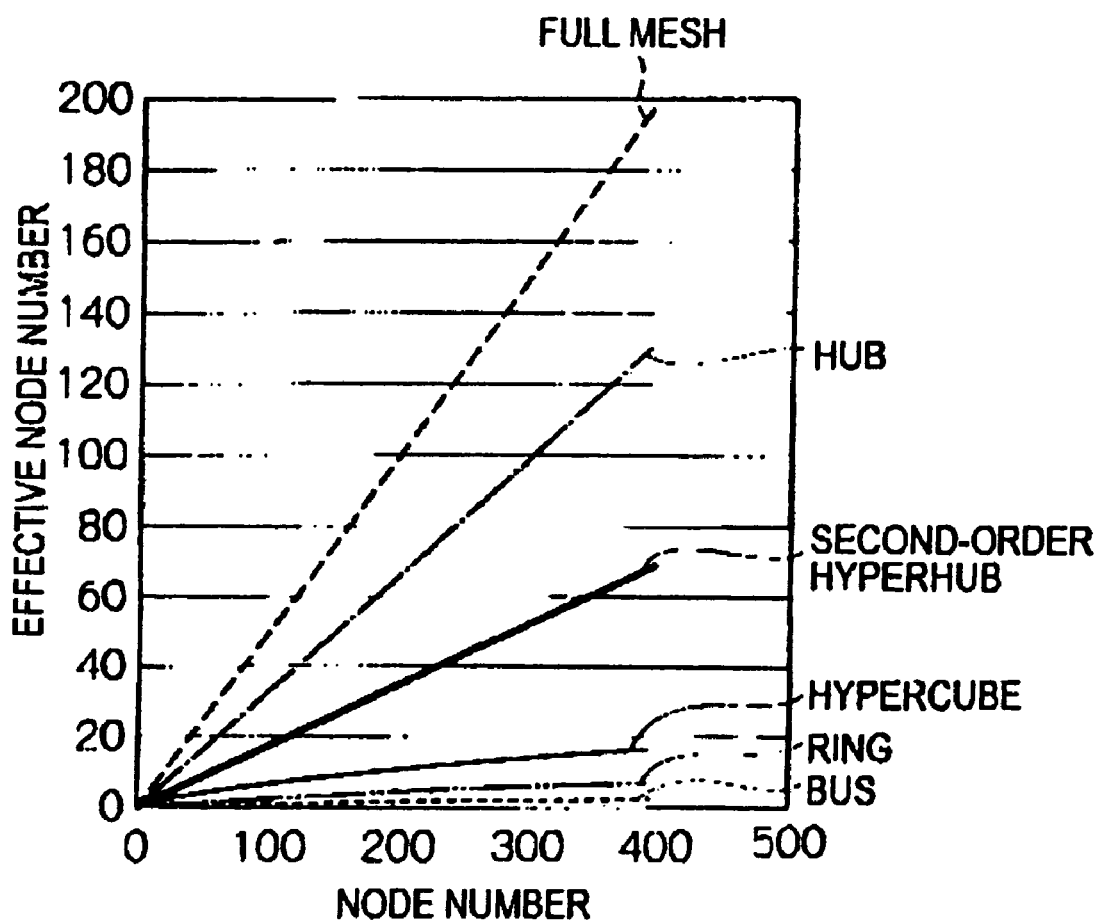
FIG. 4 is the first schematic diagram of the effects of the first embodiment.
Figure 5:
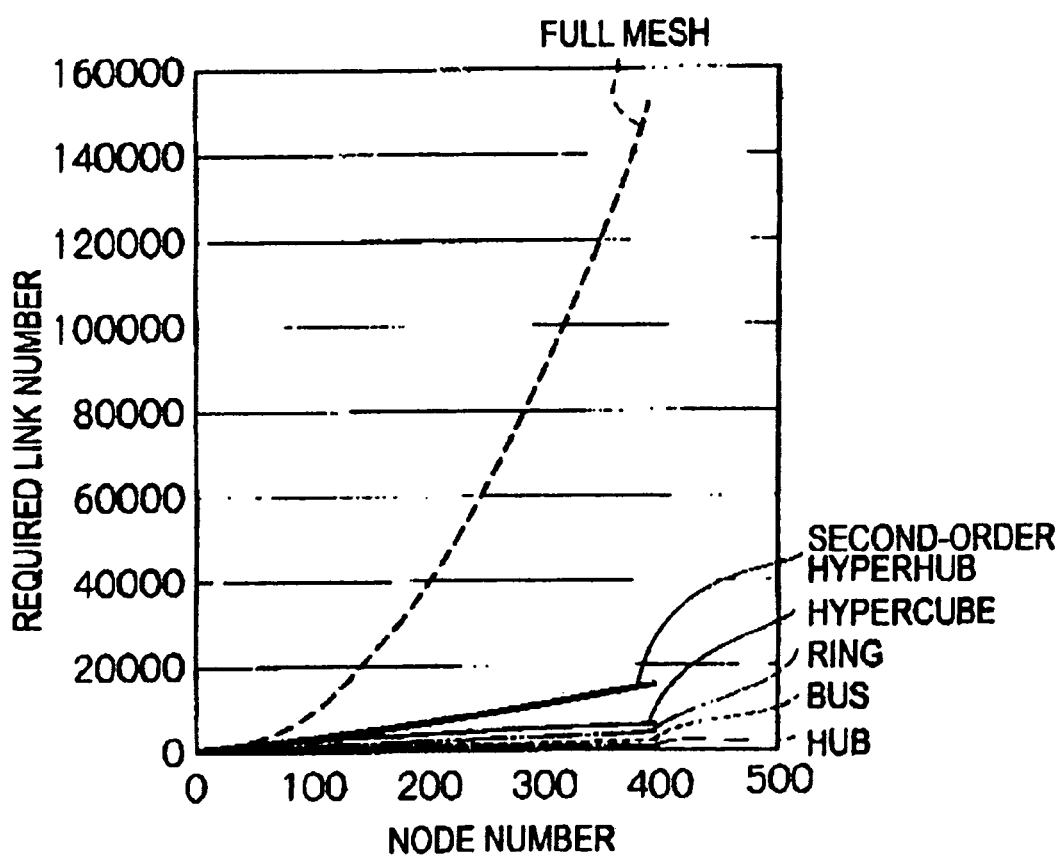
FIG. 5 is the second schematic diagram of the effects of the first embodiment.
Figure 6:
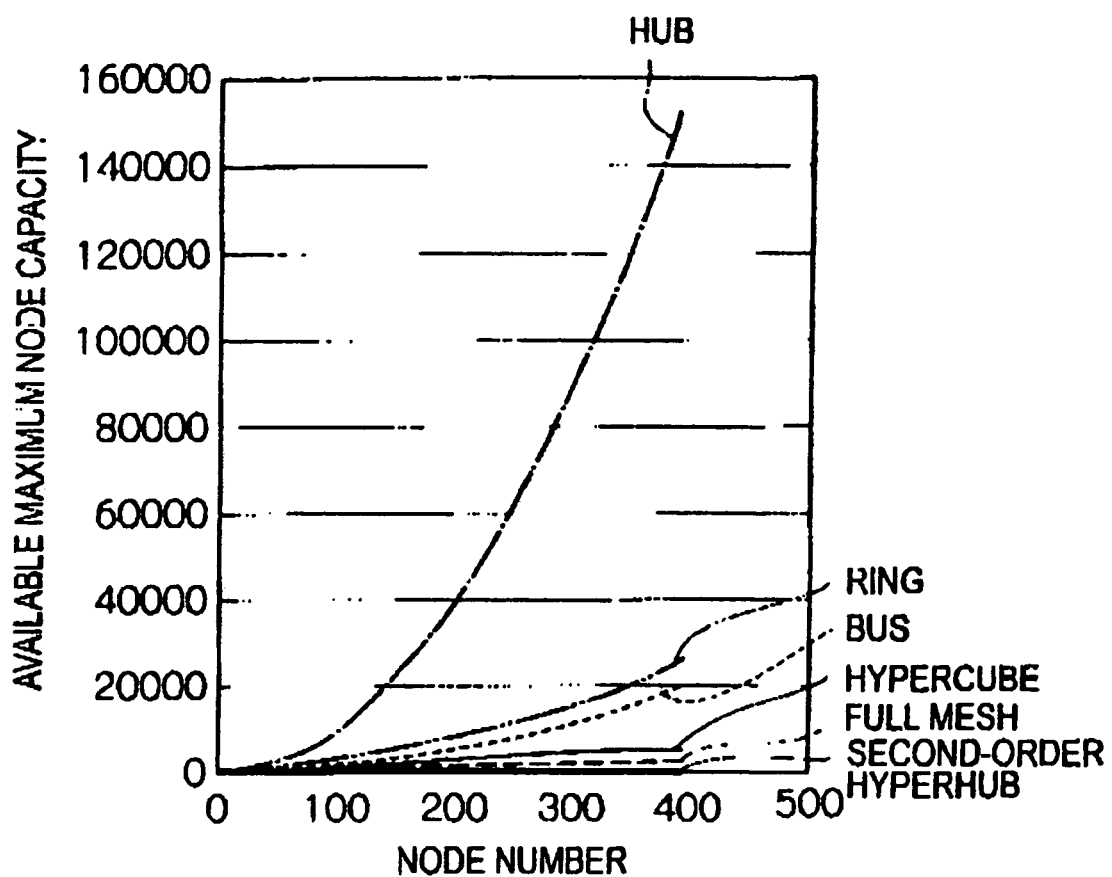
FIG. 6 is the third schematic diagram of the effects of the first embodiment.
Figure 12:
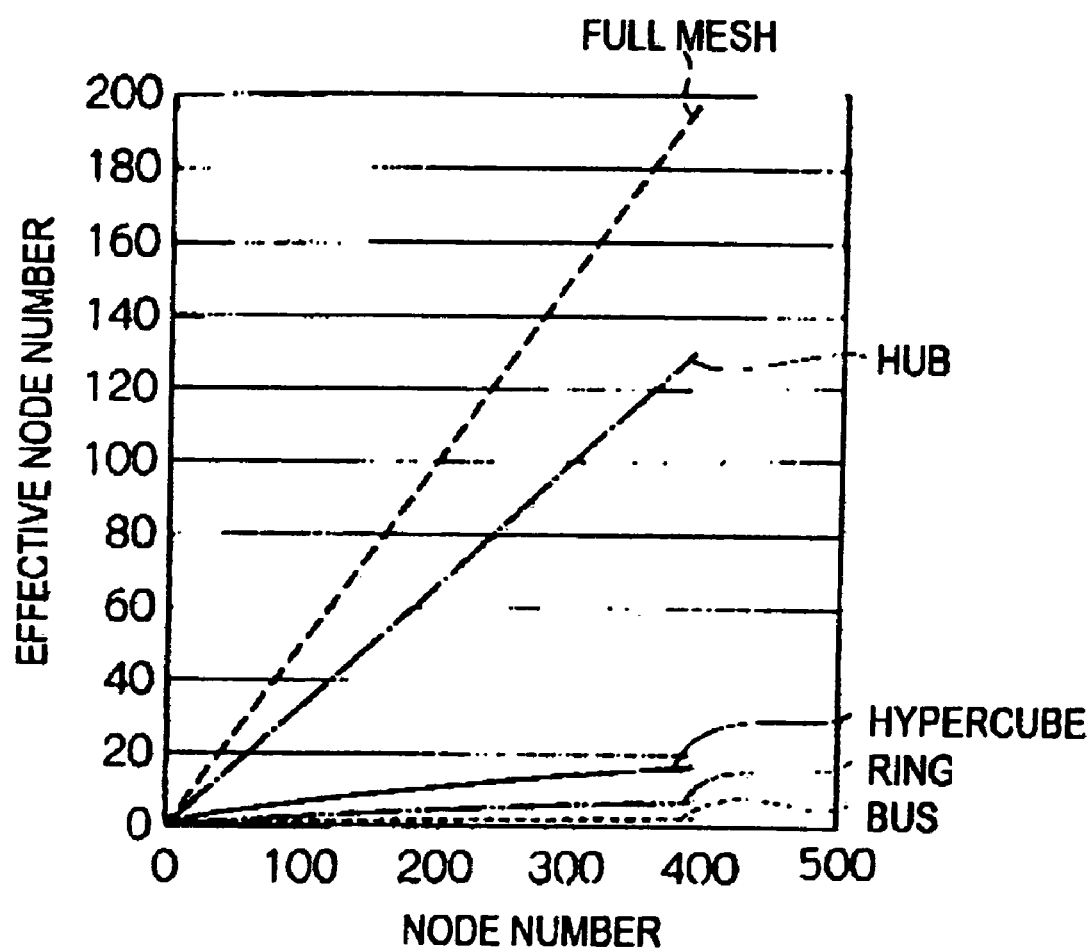
FIG. 12 is the first schematic diagram of a conventional problem.
Figure 13:
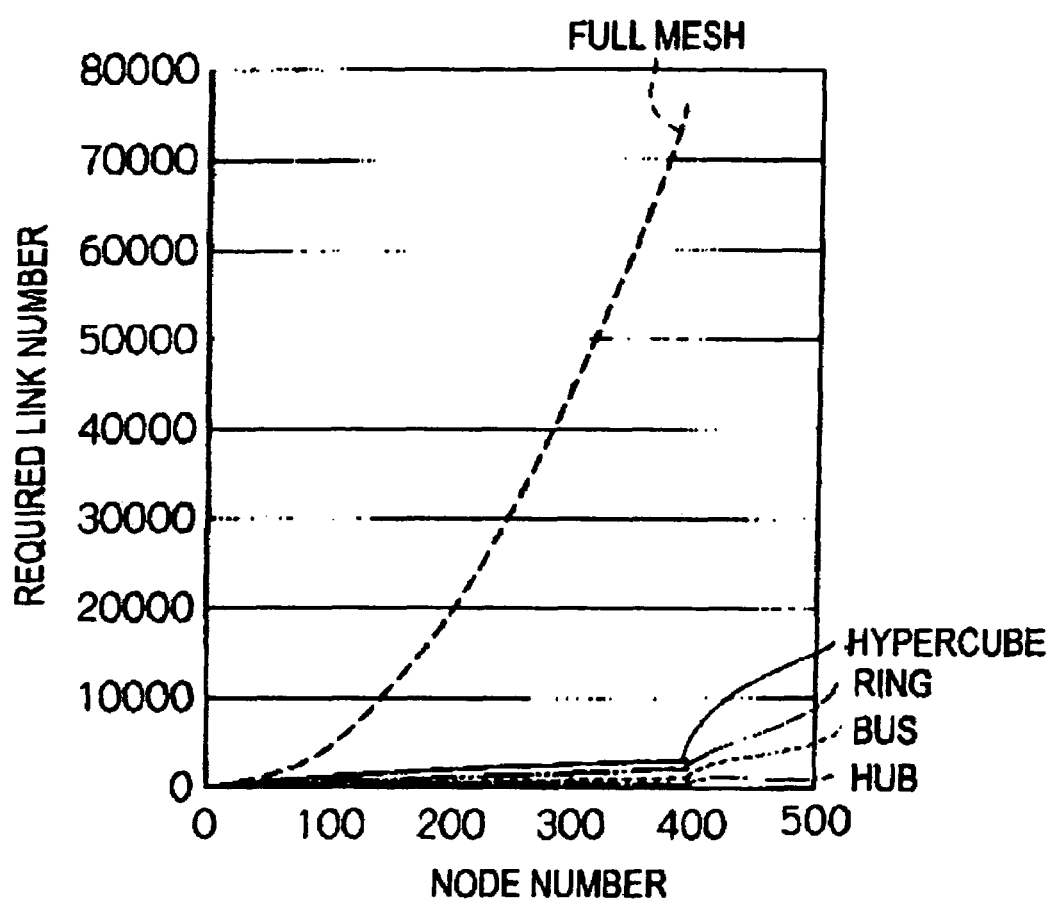
FIG. 13 is the second schematic diagram of a conventional problem.
Figure 14:
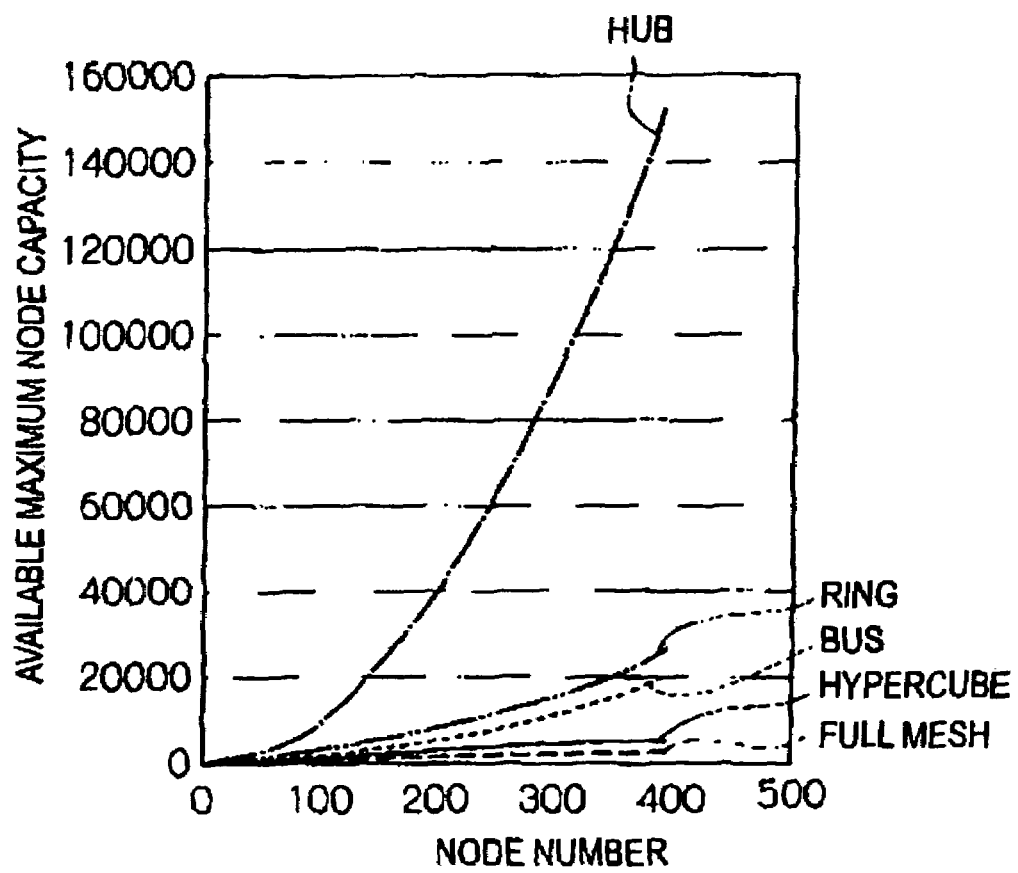
FIG. 14 is the third schematic diagram of a conventional problem.

FIGS. 4 to 6 are the result of including the characteristics of the second-order hyper hub structure in FIGS. 12 to 14 respectively and the above effects are substantiated by the drawings. Further, although the network of a second-order hyper hub structure is described here, the order is not limited to two. A hyper hub structure of m (m is an integer of two or more) order is feasible.

(B) Second Embodiment

A data transfer network of the second embodiment will be described next with reference to the drawings.

In the data transfer network NET1 of the first embodiment shown in FIG. 1, two hub networks which contain certain edge nodes $Eij$ (hub networks with core nodes $Ci$ and $Cj$) both comprise the same number (four in FIG. 1) of edge nodes.

A data transfer network NET2 of the second embodiment is the same as that of the first embodiment apart from the fact that two hub networks which contain certain edge nodes $Eij$ have different numbers of edge nodes.

Figure 7:
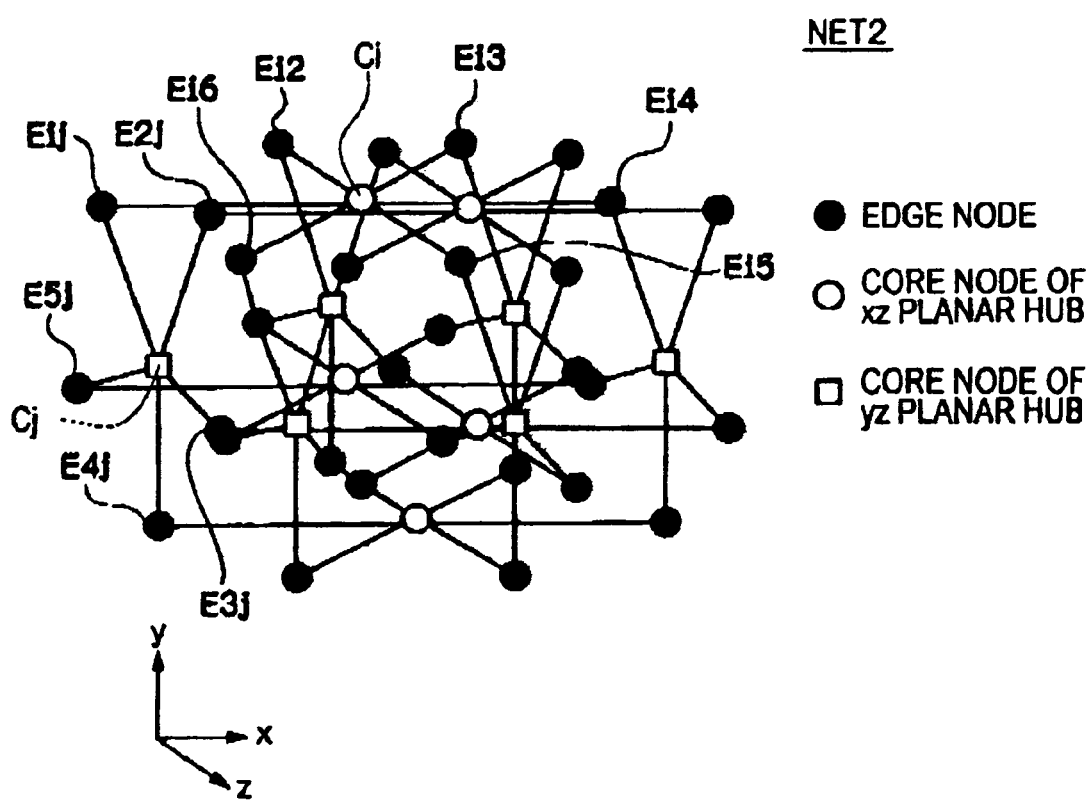
FIG. 7 is a schematic diagram showing node placement and the connected relationship between nodes of a data transfer network of a second embodiment.

In the data transfer network NET2 of the second embodiment shown in FIG. 7, there are six edge nodes of a hub network in which all edge nodes are arranged in a plane that is parallel to plane $xz$ and five edge nodes of a hub network in which all edge nodes are arranged in a plane that is parallel to plane $yz$. For example, the other edge nodes of the hub network of the core node $Ci$ to which the edge node $Eij$ belongs are nodes $Ei2$ to $Ei6$ and there are six edge nodes in the hub network of the core node $Ci$. Further, the other edge nodes of the hub network of the core node $Cj$ to which the edge node $Eij$ belongs are nodes $E2j$ to $E5j$ and there are five edge nodes in the hub network of the core node $Cj$.

As mentioned earlier, in the data transfer network of the second embodiment, the numbers of edge nodes of the two hub network which contain a certain edge node are mutually different. However, because a hyper hub structure is applied, the same effects as in the case of the first embodiment are exhibited.

(C) Third Embodiment

The data transfer network of the third embodiment will be described next with reference to the drawings.

Figure 8:
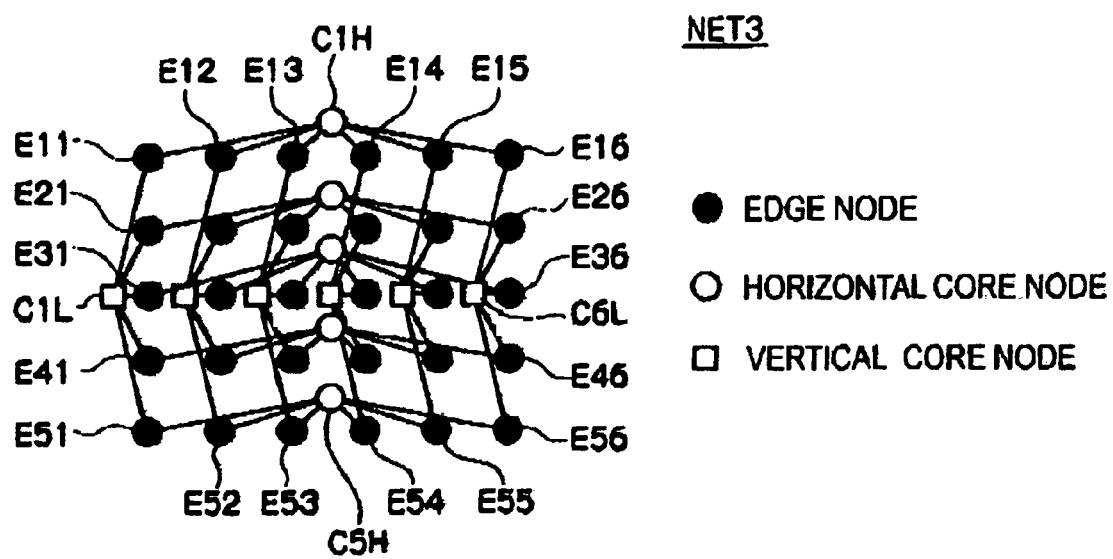
FIG. 8 is a schematic diagram showing node placement and the connected relationship between nodes of a data transfer network of a third embodiment.

In the data transfer network NET3 of the third embodiment shown in FIG. 8, the edge nodes are arranged in a matrix shape (five rows and six columns in FIG. 8). Further, the edge nodes E11 to E16, . . . E51 to E56 of the same row are connected to the core nodes C1H to C5H respectively in the same lateral direction. Further, the edge nodes E11 to E51, . . . , E16 to E56 of the same column are connected to core nodes C1L to C6L in the same vertical direction.

So too in the data transfer network of the third embodiment, as per the first embodiment, because one edge node is an element of different hub networks and the data transfer network form a hyper hub structure, the same effects as in the case of the first embodiment are exhibited.

(D) Fourth Embodiment

The data transfer network of the fourth embodiment will be described next with reference to the drawings.

So too with the data transfer network NET4 of the fourth embodiment, the placement of edge-node and core-node and the connected relationship between nodes are the same as those in FIG. 8 of the third embodiment above.

In the third embodiment above, the horizontal core nodes C1H to C5H and the vertical core nodes C1L to C6L are connected directly only to the edge nodes.

Figure 9:
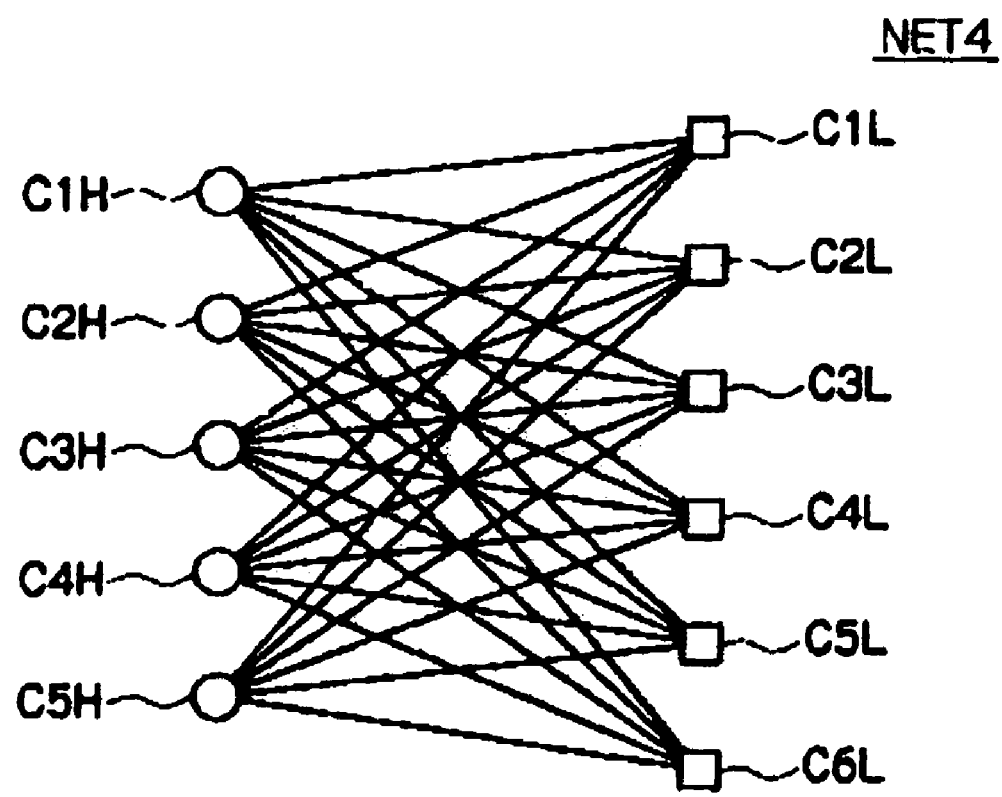
FIG. 9 is a schematic diagram showing node placement and the connected relationship between nodes of a data transfer network of a fourth embodiment.

In the data transfer network NET4 of the fourth embodiment, an interchange connection is applied as shown in FIG. 9 between the horizontal core nodes C1H to C5H and the vertical core nodes C1L to C6L. That is, the horizontal core nodes C1H, . . . , C5H are each connected to all the vertical core nodes C1L to C6L and, conversely, the vertical core nodes C1L, . . . C6L are each connected to all the horizontal core nodes C1H to C5H.

The data transfer network NET4 of the fourth embodiment has a greater number of links than that of the third embodiment but the number of hops can be reduced. For example, in a case where data are transferred from the edge node E11 to the edge node E56, in the third embodiment, a data transfer follows a route from edge node E11 to horizontal core node C1H, edge node E16, vertical core node C6L, and then edge node E56. On the other hand, in the fourth embodiment, a data transfer follows the route from edge node E11 to horizontal core node C1H, vertical core node C6L, and then edge node E56, and, hence, the number of hops is smaller.

(E) Fifth Embodiment

The data transfer network of the fifth embodiment will be described next with reference to the drawings.

Figure 10A:
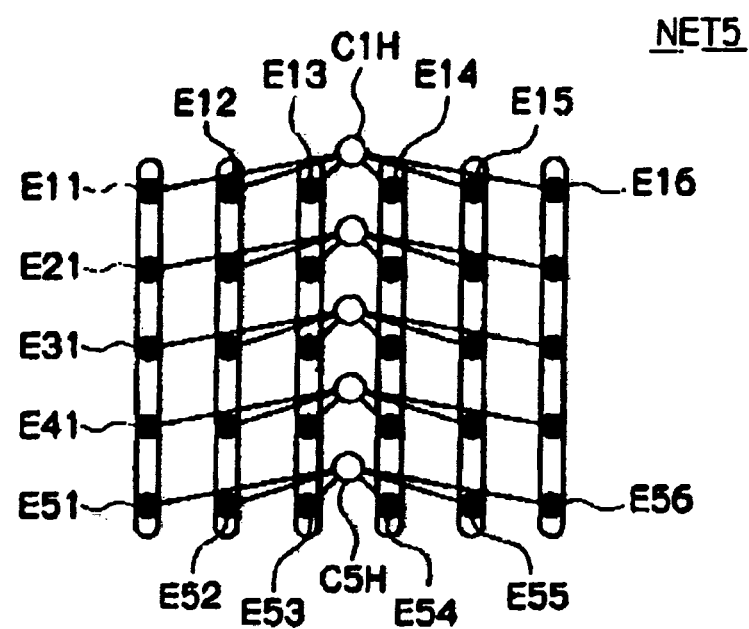
FIGS. 10A and 10B are schematic diagrams showing node placement and the connected relationship between nodes of a data transfer network of a fifth embodiment.

So too in a data transfer network NET5 of the fifth embodiment, the edge nodes are arranged functionally in a matrix shape as per the third and fourth embodiments, as shown in FIG. 10A.

Figure 10B:
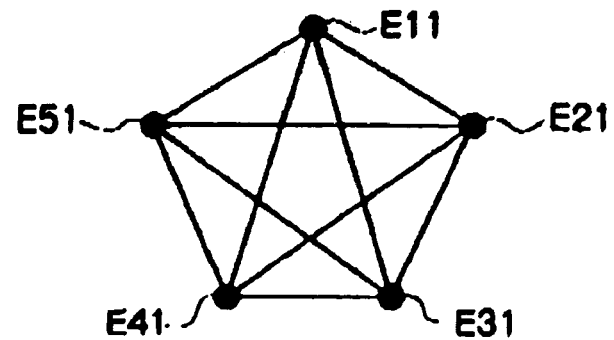

Further, the edge nodes E11 to E16, . . . , E51 to E56 of the same row are each connected to the core nodes C1H to C5H of the same horizontal direction and each row is a hub network. On the other hand, the edge nodes E11 to E51, . . . E16 to E56 of the same column each constitute a full mesh network as exemplified by the first column in FIG. 10B.

The data transfer network of the fifth embodiment has a larger number of links than the third embodiment but a reduction in the number of hops can be expected.

Further, as a modified example of the fifth embodiment, a data transfer network in which all the columns do not constitute full mesh networks and complete mesh network columns and hub network columns are mixed can be cited.

(F) Further Embodiments

In the descriptions of each of the embodiments, the ideal node placement and connected relationship between nodes are illustrated but a portion of the links and nodes and so forth (up to about 10% overall) may be missing from the respective embodiments. Conversely, some additional links and nodes and so forth may also be added to the configuration of the respective embodiments. In addition, other networks maybe added to the data transfer networks of the respective embodiments. Further, although the ideal node placement and connected relationship between the nodes was described, the claims also include modifications to this node placement and connected relationship between the nodes.

Furthermore, although the respective embodiments were mainly described by means of a second-order hyper structure, it is understood that the technological ideas of the present invention can also be applied to a hyper structure of a third- or higher order. What matters is that each node is an element of two or more local networks, at least one of the local networks to which each node belongs is a hub network and the types of local networks other than the hub network are limited to full mesh networks.

Figure 11A:
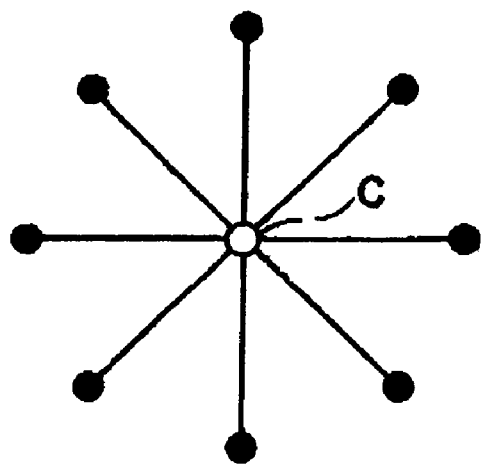
FIGS. 11A and 11B are schematic diagrams showing hub networks of two types.
Figure 11B:
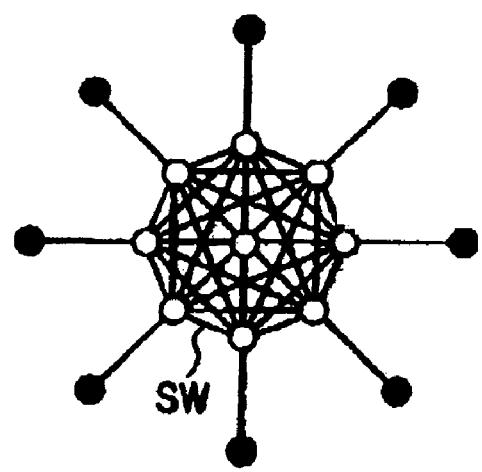

In addition, the hub network of the respective embodiments is such that the core node C shown in FIG. 11A fulfils a relay function but a hub network in which the switch network SW shown in FIG. 11B fulfils the relay function may also be applied. The hub network shown in FIG. 11B is also included in the term 'hub network' in the claims and the switch network SW in FIG. 11B is also included in the term 'core node' in the claims.

In the above description of each of the embodiments, no reference was made to the applications of the data transfer network of the present invention. However, the present invention can be applied to networks in general such as general internet networks, public communication networks, company-internal communication networks, LAN, computer networks, distributed computer networks, distributed router networks, exchange networks, various switch networks used in routers and a variety of devices, data communication networks that link CPUs and memory and so forth, and data communication networks in CPU or other LSIs, for example.

What is claimed is:

1. A data transfer network of a hyper structure, comprising: a plurality of local networks in which data is transferred between a plurality of edge nodes, wherein, each of the plurality of edge nodes is an element of more than one of the plurality of local networks;
 the plurality of local networks are hub networks;
 the plurality of edge nodes are functionally disposed in a matrix shape;
 the edge nodes in a same row are included in one horizontal hub network of the plurality of local networks;
 the edge nodes in a same column are included in one vertical hub network of the plurality of local networks;
 a core node of the horizontal hub network of the same row is connected to core nodes of all vertical hub networks via the edge nodes associated with the respective vertical hub networks; and
 a core node of the vertical hub network of the same column is connected to core nodes of all horizontal hub networks via the edge nodes associated with the respective horizontal hub networks.

2. A data transfer network of a hyper structure, comprising: a plurality of local networks in which data is transferred between a plurality of edge nodes, wherein, each of the plurality of edge nodes is an element of more than one of the plurality of local networks;
 the plurality of local networks are hub networks;
 the plurality of edge nodes are functionally disposed in a matrix shape;
 the edge nodes in a same row are included in one horizontal hub network of the plurality of local networks;
 the edge nodes in a same column are included in one vertical hub network of the plurality of local networks;
 a core node of the horizontal hub network of the same row is connected directly to core nodes of all vertical hub networks; and
 a core node of the vertical hub network of the same column is connected directly to core nodes of all vertical hub networks.

* * * * *